United States Patent [19]

Albrent et al.

[11] 4,443,137
[45] Apr. 17, 1984

[54] INDICATOR SYSTEM FOR A POWER TOOL COMPRISING DUAL PURPOSE CAM SHAFT

[75] Inventors: Gary W. Albrent, Baltimore; Robert Bradus, Randallstown, both of Md.

[73] Assignee: Black & Decker Inc., Newark, Del.

[21] Appl. No.: 290,939

[22] Filed: Aug. 7, 1981

[51] Int. Cl.³ .............................................. B23B 39/04
[52] U.S. Cl. ......................................... 408/9; 74/393; 82/29 R; 408/6; 408/16
[58] Field of Search ................. 408/6, 16, 9; 82/29 R; 74/393, 63

[56] References Cited

U.S. PATENT DOCUMENTS 4,208,930 6/1980 Hermann ............................ 82/29 R Primary Examiner—W. D. Bray
Attorney, Agent, or Firm—Finnegan, Henderson, Farabow, Garrett & Dunner

[57] ABSTRACT

An electronic power tool provided with a microprocessor operated speed control system and having a multiple gear reduction drive mechanism is provided with a gear ratio indicator system employing a dual purpose cam shaft for coordinating the mechanical gear shifting and electrical microprocessor systems. The cam shaft is provided with a first cam element for performing the gear shifting function and a second cam element, operably interconnected with the first cam element for automatically moving a switch between positions corresponding to the gear engagement selected. The switch is electrically interconnected with the microprocessor to communicate the gear ratio selected thereto.

10 Claims, 7 Drawing Figures

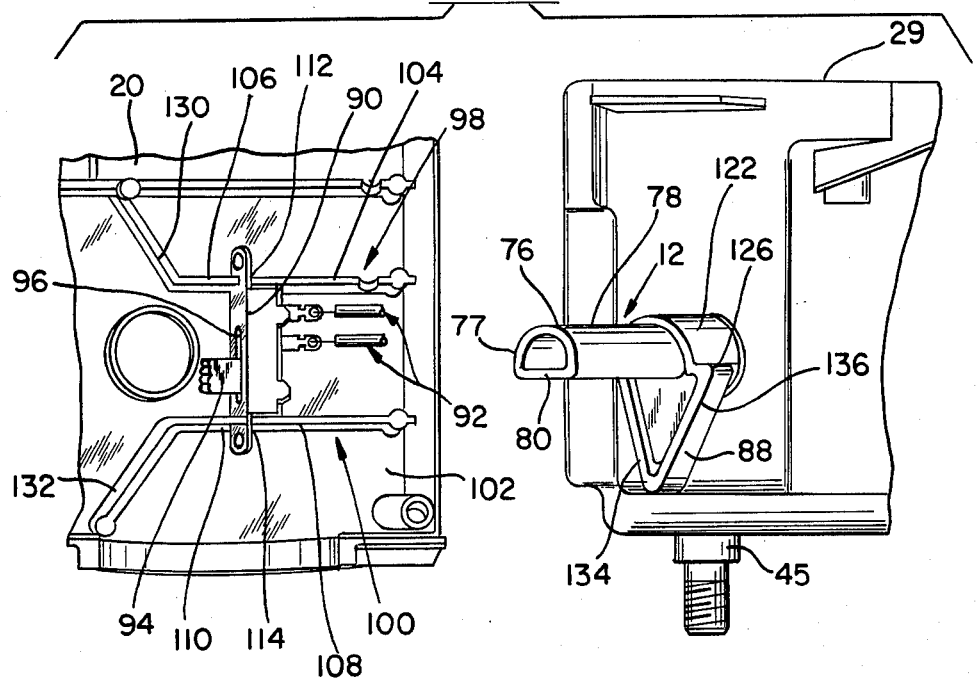
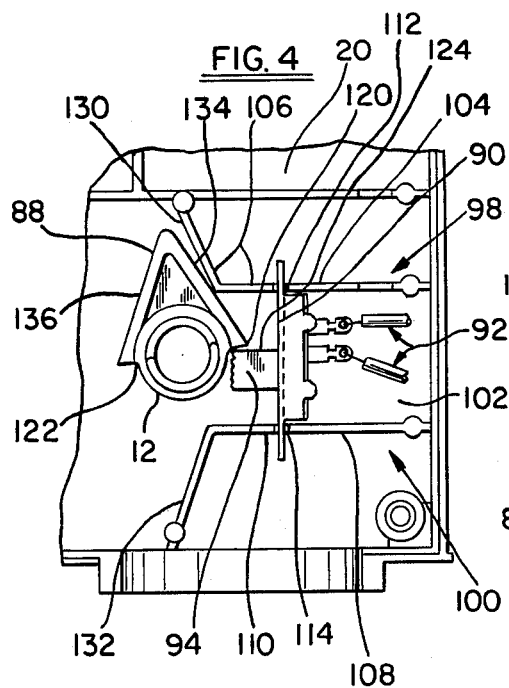
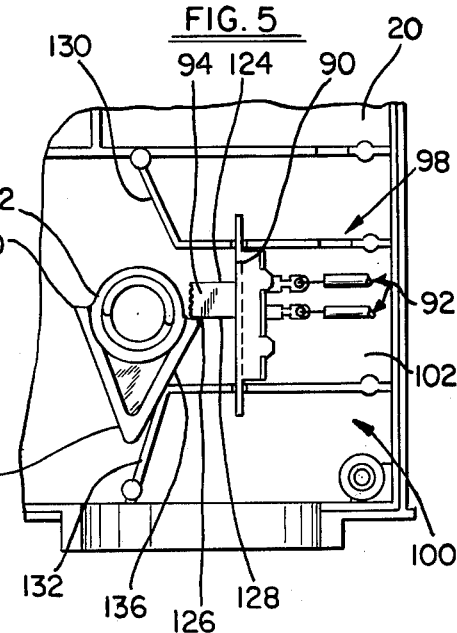

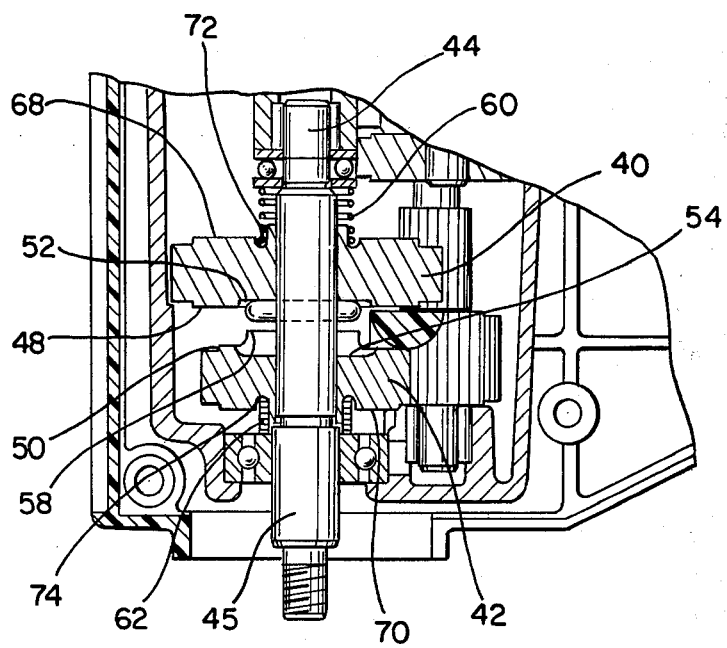

INDICATOR SYSTEM FOR A POWER TOOL COMPRISING DUAL PURPOSE CAM SHAFT

FIELD OF THE INVENTION

The present invention pertains to indicator systems for application in power tools. More particularly, the present invention pertains to gear ratio indicator systems for use in connection with power tools having an electronic speed monitoring system and multiple gear ratio mechanism.

BACKGROUND OF THE INVENTION

The rapid advances in microprocessor technology in recent years have resulted in the application of this technology in many consumer product areas. In the area of power tools, for example, microprocessor systems can be used to control or monitor such functions as the position of the tool with respect to the workpiece and the speed of the tool with far greater accuracy than could heretofore be achieved.

Microprocessor technology has been found to be particularly suitable for application in such tools as drill presses and similar devices wherein accurate monitoring and control of the output speed and depth of entry into the workpiece of the tool are particularly important. However, tools of this type often achieve a relatively broad range of output speeds by use of multiple gear ratio mchanisms, most commonly a dual gear ratio system wherein a desired output speed may be selected from first and second output ranges corresponding to first and second gear ratios. It is well known to those skilled in the art that the use of a lower drive to driven gear ratio will produce a slower, higher torque output, suitable for heavy duty work, whereas a high drive to driven gear ratio will produce a higher speed, lower torque output, suitable for lighter work.

Generally, shifting of gear ratios is a mechanical function, independent of the electronic, microprocessor system. Although the shifting function could be achieved electrically, this would add substantial circuitry and cost to the unit. Therefore, mechanical, manual shifting has been found preferable. Howver, as the manual gear shifting mechanism is operated independently of the electrical system, means must be provided to enable the electrical, microprocessor control to distinguish between gear ratio engagements in order to compute output speed as a function of armature speed and to effect speed selection and control from the selected range.

Therefore, significant benefits would be achieved by providing a mechanical gear selection system with indicator means for communicating the gear selection to the microprocessor speed selection and control system. Further advantages would be achieved by providing an indicator system which is simple and inexpensive to produce, which is reliable and which is not prone to mechanical failure or human error.

SUMMARY OF THE INVENTION

According to the present invention, a power tool, provided with microprocessor speed control circuitry and a drive mechanism having relatively high and low gear ratios, is provided with indicator means comprising a cam shaft having shifting means for effecting the engagement of the desired gear ratio and for communicating the selection to the microprocessor circuitry.

The cam shaft hereof comprises a generally cylindrical shaft and first and second cam members. The cam shaft is rotatable through 180 degrees by means of a knob on the tool housing. The first cam member is configured to engage the driven gears as the shaft is rotated to bring the gears selectively into and out of driving engagement with an output shaft. The second cam is triangular, is mounted to the shaft for rotation therewith, and is in alignment with a slide switch. The slide switch is electrically interconnected with the microprocessor and is detented into first and second positions to effect first and second circuit conditions corresponding to the gear ratio selected. The triangular cam engages the switch as the cam shaft is rotated to actuate the switch in response to gear ratio selection.

It is, therefore, an object of the present invention to provide a gear ratio indicator for communicating a manually effected gear ratio selection to microprocessor control circuitry in power tools.

It is a further object of the present invention to provide a simple and automatic linkage between the manual gear change mechanism and electronic circuitry in power tools.

It is still a further object of the present invention to provide a gear change indicator which is inexpensive to produce, which is not prone to mechanical or other failure, and which effects an automatic and reliable communication of mechanical gear selection electronic microprocessor components in power tools.

Other objects and advantages of the present invention will become evident to the skilled artisan when the following specification is read in combination with with drawings in which:

DESCRIPTION OF THE DRAWINGS

FIG. 4 is an elevation taken along lines 4—4 in FIG. 3.

FIG. 5 is a view similar to that of FIG. 4 except the cam shaft rotated 180 degrees from its position in FIG. 4.

FIG. 6 is an exploded view showing the housing in elevation and the gear case in perspective.

FIG. 7 is a sectional view taken along lines 7—7 in FIG. 3.

DESCRIPTION OF THE PREFERRED EMBODIMENT

Figure 1:
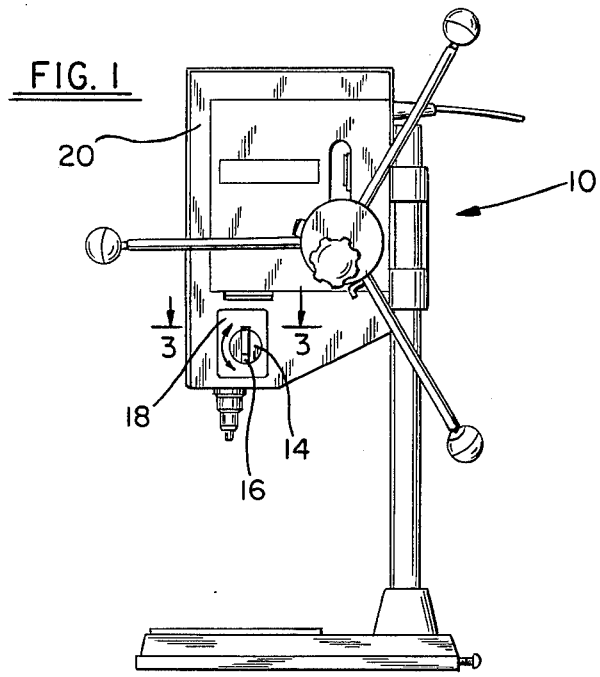
FIG. 1 is a side view of a drill press equipped with the dual purpose cam shaft hereof.

Now and with reference to FIG. 1, there is shown generally at 10 a drill press equipped with indicator means comprising the dual purpose gear shifting and position indicating cam shaft 12. The drill press 10 shown is a power driven tool equipped with a microprocessor controlled speed selection and maintenance device. It is be appreciated that, although an electronic drill press is particularly susceptible to application of the cam shaft hereof, the cam shaft 12 may be incorporated into a variety of power tool environments and the description of the drill press herein should be deemed as merely illustrative rather than limitative of the applicability hereof. The drill press 10 is provided with a control knob 14 which is rotatable through 180 degrees. The knob 14 is provided with an indicator 16 which indicates the position of the cam shaft 12. A label 18 may be affixed to the exterior housing 20 of the drill press 10, proximate the control knob 14, having indicia thereon corresponding to the positions of the control knob 14 and cam shaft 12 for the respective gear ratio engagements.

Figure 2:
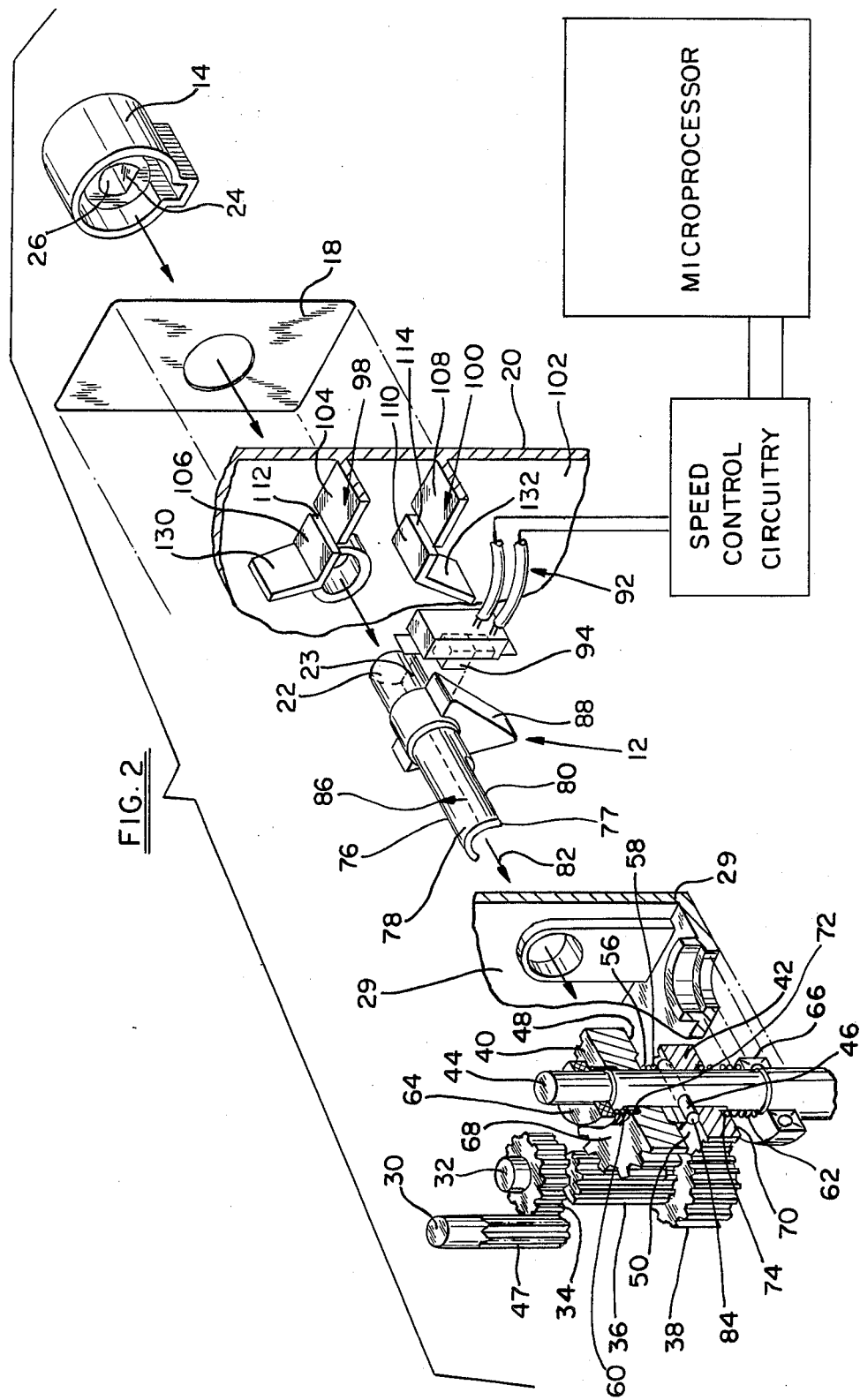
FIG. 2 is an exploded view of a portion of a drill press illustrating the dual purpose cam shaft hereof, the gear mechanism and the indicator switch, in a first position, corresponding to a first gear ratio selection.

As best seen in FIG. 2, the cam shaft 12 comprises a generally cylindrical shaft 22 having a flattened portion 23 for keying of the cam shaft 12 to a flattened portion 24 of a recess 26 in the control knob 14 such that clockwise or counterclockwise rotation of the control knob will result in like rotation of the cam shaft 12.

The cam shaft 12 extends, as shown in FIG. 6, from the exterior of the housing 20 to the interior of gear case 29 which houses the power transmission mechanism of the drill. The gear case is shown in FIGS. 2 and 7 and receives the armature shaft 30, shown in part, thereinto. The gear case 29 contains an intermediate shaft 32, having gears 34, 36 and 38 fixedly mounted thereon, and further houses first and second driven gears 40 and 42, having relatively larger and smaller numbers of teeth, which are axially aligned and mounted concentrically on an output shaft 44 and are rotatable relative thereto. A tool holder connector 45 is provided for threadingly coupling a chuck to the output shaft 44 for rotation therewith. A drive pin 46 extends transversely through the output shaft 44 for effecting a driving interconnection between the output shaft 44 and the driven gears 40 and 42.

The armature shaft 30 is provided with a toothed gear portion 47 positioned and configured to mesh with gear 34 to translate the rotational power output of the armature shaft 30 to the intermediate shaft 32. Gears 36 and 38 are drive gears having relatively smaller and larger numbers of teeth which are axially aligned and concentric with intermediate shaft 32. First and second drive gears 36 and 38 mesh with first and second driven gears 40 and 42 to provide relatively low and high drive to driven gear ratio outputs. In the embodiment shown, the ratio between the lower and higher drive to driven gear ratio outputs is about 3:1.

The output shaft is drivingly interconnected with driven gear 40 or 42 by means of drive pin 46. Drive pin 46 is disposed between two opposing faces 48 and 50 of gears 40 and 42 respectively. Each opposing face 48, 50 is provided with a slot 52, 54, through a raised hub 56 and 58 respectively, dimensioned to receive the drive pin 46 snugly therewithin. When positioned in a slot, the drive pin 46 provides a driving interconnection between the associated gear and the output shaft 44.

Each driven gear 40 and 42 is slidably mounted on output shaft 44 and is spring biased toward the drive pin 46 by an associated spring, coil springs 60, 62 and associated stop or boss 64, 66 respectively. Each spring 60, 62 is trapped between its stop 64, 66 and gear 40, 42. The exterior faces 68 and 70 of the gears 40 and 42 are each provided with a cutout portion 72, 74 for receiving the spring 60, 62. The cam shaft 12 is adapted to urge selectively either gear member 40 or 42 out of engagement with the drive pin 46 to effect shifting of the drive mechanism between first and second gear ratio positions.

Figure 3:
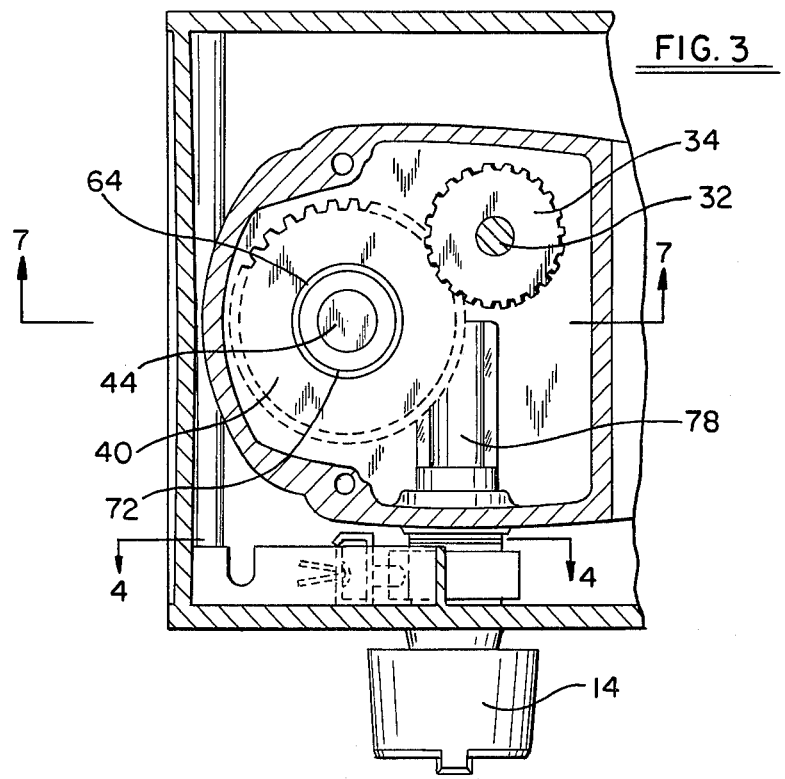
FIG. 3 is a sectional view taken along lines 3—3 in FIG. 1.

More particularly, and as shown in FIGS. 2 and 3, a first, shifting cam 76 is formed at the second end 77 of the cylindrical shaft 22. The first cam is semi-circular, having an arcuate camming portion 78 and a flat portion 80, the arcuate camming portion 78 being coaxial with the rotational axis 82 of the shaft 22 for symmetric rotation therewith. The cam 76 is positioned to extend generally in the plane containing the longitudinal axis 84 of the drive pin 46. The radius 86 of the cam 76, defined by the distance between the axis of rotation 82 and the arcuate camming portion 78, is sufficient to insure that interposition of radius 86 between gear 40 or 42 and the plane of the pin axis 84 will prevent contact between that gear and the drive pin 46.

Thus in the position shown in FIG. 2, the radius 86 of the cam 76 is interposed between first driven gear 40 and the plane of the drive pin axis 84, the camming portion 78 engaging first driven gear 40, to urge gear 40 up against spring 60, out of engagement with the drive pin 46. The second driven gear 42, urged into engagement with the drive pin 46 by its associated spring 62, is then operably interconnected with the output shaft 44. To change gear ratios, the control knob is rotated to invert the cam shaft 12 180 degrees from its orientation in FIG. 2. The camming portion 78 of cam 76 is brought out of engagement with gear 40, releasing same. Radius 87 of cam 76 is now interposed between second driven gear 42 and the plane of the pin axis 84, the arcuate camming portion 78 engaging second driven gear 42, to urge it out of engagement with the drive pin 46, against its associated spring 62. The released, first gear 40 is urged toward the drive pin for engagement therewith by its spring 60 for operable interconnection with output shaft 44.

As best seen in FIG. 2, the rotation of each driven gear remains constant and independent of its axial position on output shaft 44, each drive gear 34 and 36 being sufficiently longer than its associated driven gear 40 or 42 to prevent interruption of the driving relationship during gear shifting.

It is to be noted that the foregoing gear reduction mechanism is known and not considered part of the present invention. The indicator system and cam shaft hereof may be applied to other gear mechanisms amenable thereto.

As noted previously, the power tool hereof is provided with microprocessor-controlled speed selection and maintenance circuitry. The microprocessor-controlled system enables the operator to select and maintain accurately a desired speed setting. Generally, the microprocessor-controlled system controls the electrical power supply to the motor and varies same to achieve the desired output speed, which is a function of the rotational speed of the armature shaft and the gear ratio of the drive mechanism. As the microprocessor system generally computes tool output speed as a function of the rotational speed of the armature shaft 30, the value of the gear ratio is required to compute the output speed of the tool piece. Although a separate, operator-controlled switch could be provided for communicating gear ratio selection to the microprocessor, such a communication method is highly susceptible to human error. It is, therefore, greatly preferable that the manual gear shifting mechanism be coordinated with the microprocessor system in order that changes in gear ratio be communicated to the microprocessor automatically.

Therefore, there is provided a second indicator cam 88, operably interconnected with the first cam 76 to move responsively therewith. More particularly, in the embodiment shown, the indicator cam 88 is deployed on the cam shaft 12 and is adapted to cooperate with detection means provided in the microprocessor circuitry to communicate the gear ratio selection to the microprocessor.

As shown in FIGS. 2, 4, 5, and 6, the detection means comprises a slide switch 90, provided in the microprocessor circuitry, a portion of which is indicated generally at 92, which is supported on the drill housing 20 in alignment with indicator cam 88.

The slide switch 90 hereof is a detented, two-position device having an actuator 94 which extends toward the indicator cam 88 for actuation thereby. The actuator is slidable within a slot 96 in the switch 90 between the first and second positions, the first position effecting a first circuit condition and the second position, a second circuit condition.

The switch 90 is mounted on the housing 20 by means of iternal ribs indicated generally at 98 and 100, provided on the interior wall 102 of the housing 20. Each rib 98 and 100 comprises first and second portions 104, 106, and 108, 110 respectively. with narrow spaces 112 and 114 therebetween to retain the switch 90 securely in position on the drill housing 20 and in alignment with the indicator cam 88.

The indicator cam 88 hereof is a triangular member mounted to the cam shaft 12 for rotation therewith. 180 degree rotation of the cam shaft 12 will invert the indicator cam 88 between a first position, shown in FIGS. 2 and 5, and a second position, shown in FIG. 4. The first and second positions of the indicator cam, perforce correspond to the positions of the shifting cam 76 and, so to the gear ratio selected.

The triangular, second cam 88 is positioned to engage the actuator 94 of the switch 90, as shown in FIGS. 4 and 5. When the cam shaft 12 is positioned for operation in a first gear ratio, shown in FIG. 4, a first end portion 120 of the base 122 of the cam 88 will engage the upper surface 124 of the actuator 94 to urge same down toward a first position at the bottom of the slot 96. Slide switch 90 is detented, and the detent will cause actuator 94 to ride into this first, lower position shown when it is urged more than halfway thereto.

When the cam shaft 12 is rotated 180 degrees, to effect gear shifting, indicator cam 88 is inverted from the position shown in FIG. 4 to that shown in FIG. 5. In this position, the second end portion 126 of second cam base 122 will engage the lower surface 128 of actuator 94 to urge the actuator up to a second position in the upper portion of slot 96. Again, the detect will cause the actuator 94 to ride into its upper position as shown when it has been urged more than halfway thereto.

As the rotation of the camshaft during gear shifting causes the indicator cam 88 to move actuator 94 of the slide switch 90 between the first and second positions, effecting first and second circuit conditions, the condition of the microprocessor or circuitry will be directly related to the gear reduction ratio selected. Thus, through its circuit condition, the microprocessor can distinguish between gear ratios to determine the speed of the tool piece as a function of the gear ratio applied.

The cam shaft 12 cannot be permitted to turn past 180 degrees either in a clockwise or counterclockwise direction, lest the ends 120, 126 of the triangular cam 88 be jammed against the actuator 94 of the slide switch 90 and damage same. Acccordingly, the second portions 106 and 110 of the ribs 98 and 100 are provided with angular extensions 130, 132 which extend toward the indicator cam 88 and are configured to engage its sides 134 and 136 when the cam shaft reaches the extremes of its 180 degree turn. In this manner, the extensions 130 and 132 define stops which engage the cam 88 at a point at which actuator 94 has been urged sufficiently toward the position corresponding to the gear ratio selected to enable it to ride into position but before excessive pressure has been applied thereagainst. Moreover, the stops further serve to prevent the shifting cam 76 from being rotated past its proper position.

The indicator system hereof coordinates the mechanical function of gear selection with the electrical, microprocessor speed selection and control system automatically. As the cam shaft 12 may be an integrally formed member, it is susceptible to economical manufacturing techniques.

A particular advantage of the present system lies in the automatic communication of gear position without requiring any positive, additional action by the operator. The structural simplicity and automatic function of the cam shaft hereof renders the communication of gear ratio to the microprocessor extremely reliable, as the potential for mechanical failure or human error is greatly reduced.

Many adaptations and variations of the present dual purpose, gear shifting and indicating cam shaft, for example, those required in adapting the present teachings for use in other gear reduction mechanisms, will become obvious to skilled artisans, all such adaptations and variations falling within the scope and spirit of the appended claims.

What is claimed is:

1. A cam shaft for use in power tools having microprocessor-operated speed control circuitry, multiple gear ratios and a multiple gear ratio drive mechanism, said cam shaft comprising:

a shaft;

a first cam member associated with said shaft and with said drive mechanism and adapted to cooperate with said shaft to effect shifting of said drive mechanism between said gear ratios;

and a second cam member, associated with said shaft and said first cam member and adapted to communicate to said microprocessor, through said circuitry, the gear ratio through which said drive mechanism operates, selected by means of said shaft and first cam member.

2. A cam shaft for use in power tools having microprocessor-operated speed control circuitry, multiple gear ratios and a multiple gear ratio drive mechanism, said cam shaft comprising:

a shaft;

a first cam member, associated with said drive mechanism and coupled with said shaft for movement between predetermined positions to effect shifting of said drive mechanism between gear ratios on actuation of said shaft; and a second cam member, coupled with said shaft and said first cam member for movement between predetermined positions on actuation of said shaft and associated with said microprocessor, through said circuitry, for communication thereto of the positions of said cam members.

3. A cam shaft for use in power tools having multiple gear ratios, a multiple gear ratio drive mechanism and microprocessor-operated speed control circuitry, said cam shaft comprising:

a shaft;

a first cam member, associated with said drive mechanism and coupled with said shaft for rotation therewith between first and second positions to effect selective engagement of gears in said drive mechanism for shifting between said gear ratios; and a second, substantially triangular cam member, coupled with said shaft and said first cam member for rotation therewith between first and second positions corresponding to said first and second positions of said first cam member, and associated with said microprocessor, through said circuitry to permit communication of said position of said second cam member to said microprocessor.

4. A gear ratio indicator system for use in combination with an electronic power tool having multiple gear ratios, a multiple gear ratio drive mechanism and a microprocessor-operated speed control system, said indicator system comprising:

circuit means associated with said microprocessor and having detection means associated therewith; and a cam shaft having a shaft and first and second cams associated with said shaft, said first cam element being associated with said drive mechanism and adapted to effect shifting between said gear ratios on actuation of said shaft, and said second cam being adapted for movement between predetermined positions on actuation of said shaft to permit detection of said movement by said detection means.

5. A gear ratio indicator system for use in combination with an electronic power tool having multiple gear ratios, a multiple gear ratio drive mechanism and a micro-processor-operated speed control system, said indicator system comprising:

a circuit means associated with said microprocessor;

switch means for selectively effecting first and second circuit conditions in said circuit means; and a cam shaft having a shaft and first and second cam elements, said first cam element being associated with said drive mechanism and coupled with said shaft for movement between predetermined positions on actuation thereof to effect selective engagement of gears in said drive mechanism for shifting between said gear ratios and said second cam being coupled with said shaft and said first cam member for movement between predetermined positions corresponding to said predetermined positions of said first cam member, said second cam member being positioned and configured to actuate said switch means by movement into said predetermined positions.

6. A gear ratio indicator system for use in combination with an electronic power tool having multiple gear ratios, a multiple gear ratio drive mechanism and a micro-processor-operated speed control system, said indicator system comprising:

circuit means associated with said microprocessor;

switch means for selectively effecting first and second circuit conditions in said circuit means; and a cam shaft having a shaft and first and second cam elements, said first cam element being associated with said drive mechanism and coupled with said shaft for movement between predetermined positions on actuation thereof to effect selective engagement of gears in said drive mechanism for shifting between said gear ratios and said second cam having at least three sides and being coupled with said shaft for movement on actuation thereof between predetermined positions for actuation of said switch means by a side of said cam on movement of said second cam by actuation of said shaft.

7. A gear ratio indicator system for use in combination with an electronic power tool having multiple gear ratios, a multiple gear ratio drive mechanism and a micro-processor-operated speed control system, said indicator system comprising:

circuit means associated with said microprocessor;

switch means for selectively effecting first and second circuit conditions in said circuit means; and a cam shaft having a shaft and first and second cam elements, said first cam element being associated with said drive mechanism and coupled with said shaft for rotation therewith between first and second positions to effect selective engagement of gears in said drive mechanism for shifting between said gear ratios and said second cam having a substantially triangular configuration comprising an apex and a base and being coupled with said shaft for rotation therewith and positioned for actuation of said switch means by said cam base in rotation of said triangular cam with said shaft.

8. An electronic power tool comprising:
a housing;
a power drive means;
a microprocessor-operated speed control system;
a circuit means, associated with said microprocessor;
a drive mechanism having gears and being operable through a plurality of gear ratios; and
a cam shaft comprising:
  a shaft;
  a first cam member, associated with said shaft and with said drive mechanism and adapted to effect selective shifting between said gear ratios in said drive mechanism, on actuation of said shaft, and
  a second cam member, associated with said shaft and said first cam member and adapted to communicate to said microprocessor, through said circuit means, the gear ratio selected.

9. An electronic power tool comprising:
a housing;
a power drive means;
a microprocessor-operated speed control system;
multiple gear ratios and a multiple gear ratio drive mechanism; and
a gear ratio indicator system, comprising:
  circuit means associated with said microprocessor,
  switch means for selectively effecting first and second circuit conditions in said circuit means, and
  a cam shaft having a shaft and first and second cam elements associated therewith, said first cam element being associated with said drive mechanism and adapted to cooperate with said shaft to effect shifting in said drive mechanism between said gear ratios and said second cam element being adapted to actuate said switch means in response to the shifting between said gear ratios by said first cam element.

10. An electronic power tool comprising:
a housing;
a power drive means;
a microprocessor-operated speed control system;
multiple gear ratios and a multiple gear ratio drive mechanism; and
a gear ratio indicator system, comprising:
  circuit means associated with said microprocessor, switch means for selectively effecting first and second circuit conditions in said circuit means, and a cam shaft having a shaft and first and second cam elements, said first cam element being associated with said drive mechanism and coupled with said shaft for rotation therewith between predetermined positions to effect selective engagement of gears in said drive mechanism for shifting between said gear ratios and said second cam element having a substantially triangular configuration and being coupled with said shaft for rotation therewith between predetermined positions corresponding to said predetermined positions of said first cam element, and second cam element being positioned to actuate said switch means by movement into said predetermined positions.

* * * * *